United States Patent
Lai et al.

(10) Patent No.: US 12,074,800 B2
(45) Date of Patent: Aug. 27, 2024

(54) MEMORY CONTROL SYSTEM AND MEMORY CONTROL METHOD

(71) Applicant: REALTEK SEMICONDUCTOR CORPORATION, Hsinchu (TW)

(72) Inventors: Chi-Shao Lai, Hsinchu (TW); Hsu-Tung Shih, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/196,620

(22) Filed: May 12, 2023

(65) Prior Publication Data

US 2023/0396552 A1 Dec. 7, 2023

(30) Foreign Application Priority Data

Jun. 1, 2022 (TW) .................................. 111120515

(51) Int. Cl.
*H04L 47/24* (2022.01)
*H04L 41/16* (2022.01)
*H04L 47/56* (2022.01)

(52) U.S. Cl.
CPC .............. *H04L 47/24* (2013.01); *H04L 41/16* (2013.01); *H04L 47/56* (2013.01)

(58) Field of Classification Search
None
See application file for complete search history.

(56) References Cited

U.S. PATENT DOCUMENTS

| 11,269,797 B2 | 3/2022 | Lai | |
|---|---|---|---|
| 2002/0085491 A1* | 7/2002 | Beshai | H04Q 11/06 370/380 |
| 2007/0113023 A1* | 5/2007 | Arulambalam | G06F 13/3625 711/147 |

(Continued)

FOREIGN PATENT DOCUMENTS

| EP | 0991999 B1 * | 6/1998 |
|---|---|---|
| TW | I512464 B * | 1/2011 |

(Continued)

OTHER PUBLICATIONS

D. Stiliadis and A. Varma, "Latency-rate servers: a general model for analysis of traffic scheduling algorithms," in IEEE/ACM Transactions on Networking, vol. 6, No. 5, pp. 611-624, Oct. 1998, doi: 10.1109/90.731196, IEEE.

(Continued)

*Primary Examiner* — Phyllis A Book
(74) *Attorney, Agent, or Firm* — WPAT, P.C

(57) ABSTRACT

A memory control system includes a front-end circuitry, a back-end circuitry, and a traffic scheduling circuitry. The front-end circuitry is configured to receive a plurality of access requests from a plurality of devices, and adjust an order of the plurality of devices to access a memory according to a plurality of control signals. The traffic scheduling circuitry is configured to generate a plurality of traffic data based on the plurality of access requests and analyze the plurality of traffic data based on a neural network model and a predetermined rule, in order to determine the plurality of control signals. The back-end circuitry is configured to adjust a task schedule of the memory according to the plurality of control signals.

18 Claims, 6 Drawing Sheets

(56) References Cited

U.S. PATENT DOCUMENTS

| | | | | |
|---|---|---|---|---|
| 2012/0137090 A1* | 5/2012 | Biswas | ............... | G06F 12/1018 |
| | | | | 711/E12.001 |
| 2012/0155264 A1* | 6/2012 | Sharma | ............... | H04L 43/0852 |
| | | | | 370/232 |
| 2014/0280357 A1* | 9/2014 | Billa | ........................ | G06F 3/067 |
| | | | | 707/797 |
| 2015/0019803 A1* | 1/2015 | Miller | .................... | G06F 3/0611 |
| | | | | 711/125 |
| 2016/0139807 A1 | 5/2016 | Lesartre | | |
| 2017/0083474 A1* | 3/2017 | Meswani | ............ | G06F 12/0862 |
| 2018/0343686 A1* | 11/2018 | Manepalli | ............. | H04W 76/28 |
| 2018/0364945 A1 | 12/2018 | Tseng | | |
| 2019/0205284 A1* | 7/2019 | Fleming | .................. | G06F 9/542 |
| 2021/0144733 A1* | 5/2021 | Rost | .................. | H04W 72/1268 |
| 2023/0198865 A1* | 6/2023 | Mann | ....................... | H04L 41/16 |
| | | | | 709/224 |

FOREIGN PATENT DOCUMENTS

| | | |
|---|---|---|
| TW | I514157 B | 12/2015 |
| TW | I645295 B | 12/2018 |

OTHER PUBLICATIONS

Li, Y., Akesson, B. & Goossens, K. "Architecture and analysis of a dynamically-scheduled real-time memory controller". 52, 675-729 (2016). Real-Time Syst.

ARM, "AMBA Adaptive Traffic Profiles Specification", 2017, ARM.

Stevens, "Quality of Service (QoS) in ARM® Systems: An Overview", Jul. 2014, ARM.

OA letter of a counterpart TW application (appl. No. 111120515) mailed on Nov. 25, 2022. Summary of the TW OA letter in regard to the TW counterpart application:1. Claims 1-10 are alleged to be unpatentable over (TW I645295 B, also published as US20180364945A1) in view of (TW I514157 B, also published as US20160139807A1).Correspondence bewteen claims of TW counterpart application and claims of US application: 1. Claims 1-9 and 10 in TW counterpart application correspond to claims 1-9 and 11 in US application, respectively.

Greenberg "Architectural Options for LPDDR4 Implementation in Your Next Chip Design", 2016, Synopsys, Inc.

\* cited by examiner

MEMORY CONTROL SYSTEM AND MEMORY CONTROL METHOD

BACKGROUND OF THE INVENTION

1. Field of the Invention

The present disclosure relates to a memory control system. More particularly, the present disclosure relates to a memory control system and a memory control method that utilize a neural network model to automatically adjust a schedule of accessing a memory.

2. Description of Related Art

Existing memory controllers often use the concept of decision tree(s) to adjust the access scheduling of a memory to achieve better stability and predictability. However, the decision tree is set by updating decision conditions according to known condition(s) through the firmware. As a result, such memory controller is unable to instantaneously optimize the performance of devices that are more sensitive to delay time.

SUMMARY OF THE INVENTION

In some aspects, an object of the present disclosure is to, but not limited to, provide a memory control system and a memory control method that utilize a neural network model to automatically adjust a schedule of accessing a memory.

In some aspects, a memory control system includes a front-end circuitry, a back-end circuitry, and a traffic scheduling circuitry. The front-end circuitry is configured to receive a plurality of access requests from a plurality of devices, and adjust an order of the plurality of devices to access a memory according to a plurality of control signals. The traffic scheduling circuitry is configured to generate a plurality of traffic data based on the plurality of access requests and analyze the plurality of traffic data based on a neural network model and a predetermined rule, in order to determine the plurality of control signals. The back-end circuitry is configured to adjust a task schedule of the memory according to the plurality of control signals.

In some aspects, a memory control method includes the following operations: receiving a plurality of access requests from a plurality of devices via a plurality of connection ports, respectively; generating a plurality of traffic data based on the plurality of access requests, and analyzing the plurality of traffic data based on a neural network model and a predetermined rule, in order to determine a plurality of control signals corresponding to the plurality of devices, respectively; and adjusting a task schedule of a memory and an order of the plurality of devices to access the memory according to the plurality of control signals.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system implemented with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, similar/identical elements in various figures are designated with the same reference number.

Figure 1:
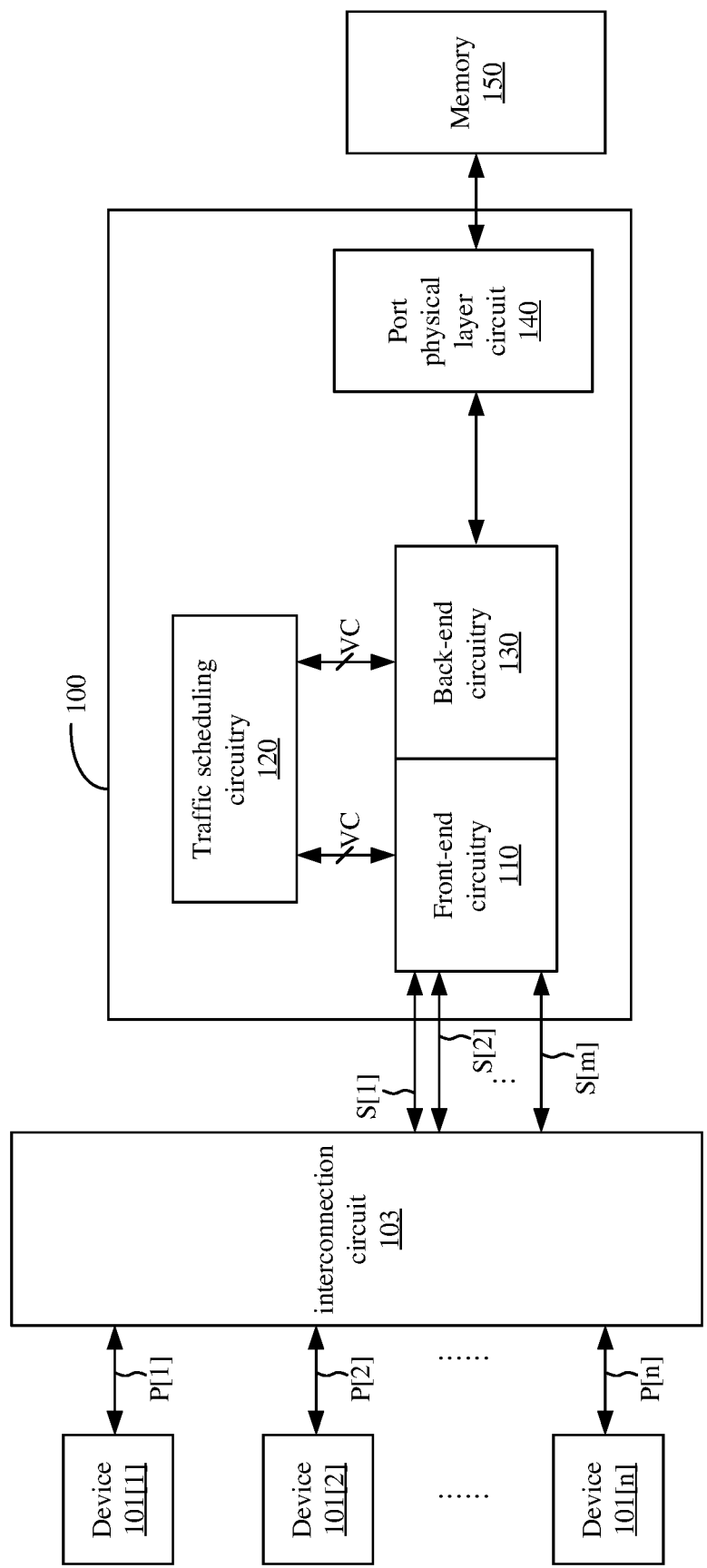
FIG. 1 illustrates a schematic diagram of a memory control system according to some embodiments of the present disclosure.

FIG. 1 illustrates a schematic diagram of a memory control system 100 according to some embodiments of the present disclosure. In some embodiments, the memory control system 100 may be implemented with a system-on-chip. In some embodiments, the memory control system 100 may be configured to adjust a task schedule of the memory 150 and an order of devices 101[1]-101[n] to access the memory 150 according to real-time requirements of those devices, in order to maintain the overall system performance, in which n may be a positive integer greater than 1.

In some embodiments, the memory control system 100 may be coupled to the devices 101[1]-101[n] via an interconnection circuit 103, in which interconnection circuit 103 may include various types of bus circuit(s). For example, the interconnection circuit 103 may include, but not limited to, an advanced extensible interface circuit. The devices 101[1]-101[n] may be connected to the interconnection circuit 103 via connection ports P[1]-P[n], respectively.

The memory control system 100 includes a front-end circuitry 110, a traffic scheduling circuitry 120, a back-end circuitry 130, and a port physical layer (PHY) circuit 140. The front-end circuitry 110 includes an interface circuit (not shown) that may be coupled to the connection ports P[1]-P[n] and the devices 101[1]-101[n] via the interconnection circuit 103. The front-end circuitry 110 is configured to receive access requests issued from the devices 101[1]-101[n]. In some embodiments, the front-end circuitry 110 may perform an initial arbitration on access request(s) corresponding to each connection port P[1]-P[n]. For example, the front-end circuitry 110 may perform an initial arbitration according to information including, but not limited to, quality of service (QoS) level, access expiration value (e.g., upper limit for one read/write operation), and/or upper limit of a number of outstanding request(s) of each connection port P[1]-P[n].

In some other embodiments, when the number of the devices 101[1]-101[n] increases and the locations of the connection ports P[1]-P[n] are decentralized, the devices 101[1]-101[n] may be connected to connection ports S[1]-S[m] via the hierarchical distribution performed by the interconnection circuit 103 according to a traffic model, in which the value m is much smaller than the value n. The front-end circuitry 110 may perform an initial arbitration on access request(s) corresponding to each connection port S[1]-S[m]. For example, the front-end circuitry 110 may perform the initial arbitration according to information including the QoS level, the access expiration value, and/or the upper limit of the number of outstanding requests of each connection port S[1]-S[m].

The traffic scheduling circuitry 120 is configured to generate multiple traffic data (e.g., traffic data D[1]-D[n] in FIG. 2) based on the access requests, and analyze the traffic data based on a neural network model and a predetermined rule to determine control signals VC. The traffic scheduling circuitry 120 may be coupled to interface circuit(s) in the front-end circuitry 110 (e.g., the connection ports S[1]-S[m] or the connection ports P[1]-P[n]) to receive access requests from the devices 101[1]-101[n]. Related arrangements and operations about the traffic scheduling circuitry 120 will be provided with reference to FIG. 2. In some other embodiments, the traffic scheduling circuitry 120 may directly monitor the connection ports S[1]-S[m], to obtain access requests issued from the devices 101[1]-101[n]. In other words, in different embodiments, the traffic scheduling circuitry 120 may monitor the connection ports P[1]-P[n] or the connection ports S[1]-S[m], to obtain the access requests.

The back-end circuitry 130 is coupled to the memory 150 via the port physical layer circuit 140 and adjusts the task schedule of the memory 150 according to the control signals VC, and the front-end circuitry 110 may adjust the order of the devices 101[1]-101[n] to access the memory 150 according to the control signals VC. As a result, the time for the devices 101[1]-101[n] to access data in the memory 150 can be adjusted. For example, when the traffic scheduling circuitry 120 determines a time for a specific device (e.g., the device 101[1]) to read the memory 150 will exceed an expected value according to the traffic data, the traffic scheduling circuitry 120 may output the control signals VC to control the back-end circuitry 130 to improve the read priority of the memory 150 and extend its operating time, and output the control signals VC to control the front-end circuitry 110 to improve the decision priority of a specific connection port (e.g., the connection port S[1]) which is connected to the specific device to maintain the averaging time for the specific device to access the memory 150. In other words, the decision results (i.e., the control signals VC) generated by the traffic scheduling circuitry 120 may be utilized to set the order of the connection ports S[1]-S[m] to access the memory 150, in order to maintain the overall system performance.

In some embodiments, the memory 150 may be, but not limited to, a synchronous dynamic random-access memory. In some embodiments, the port physical layer circuit 140 may include a data transceiver circuit, a clock/power management circuit, a command/address control circuit, a data queue circuit, and so on, in order to operate as a communication medium between the back-end circuitry 130 and the memory 150. The back-end circuitry 130 may convert a transmission protocol to a memory protocol and schedule memory commands (which includes, for example and is not limited to, read, write, activate, pre-charge, auto-refresh, and so on).

In some embodiments, each of the front-end circuitry 110 and the back-end circuitry 130 may be implemented with at least one digital logic control circuit. For example, the front-end circuitry 110 may include an interface circuit, a register circuit, an arbiter circuit, and so on, and the back-end circuitry 130 may include an interface circuit, a register circuit, a scheduler circuit, and so on. In some embodiments, the front-end circuitry 110 and the back-end circuitry 130 may be integrated into a memory controller circuitry. In some embodiments, the front-end circuitry 110 and the back-end circuitry 130 may be implemented with an existing memory controller circuit. Various implementations about the above circuitries are given for illustrative purposes, and the present disclosure is not limited thereto.

Figure 2:
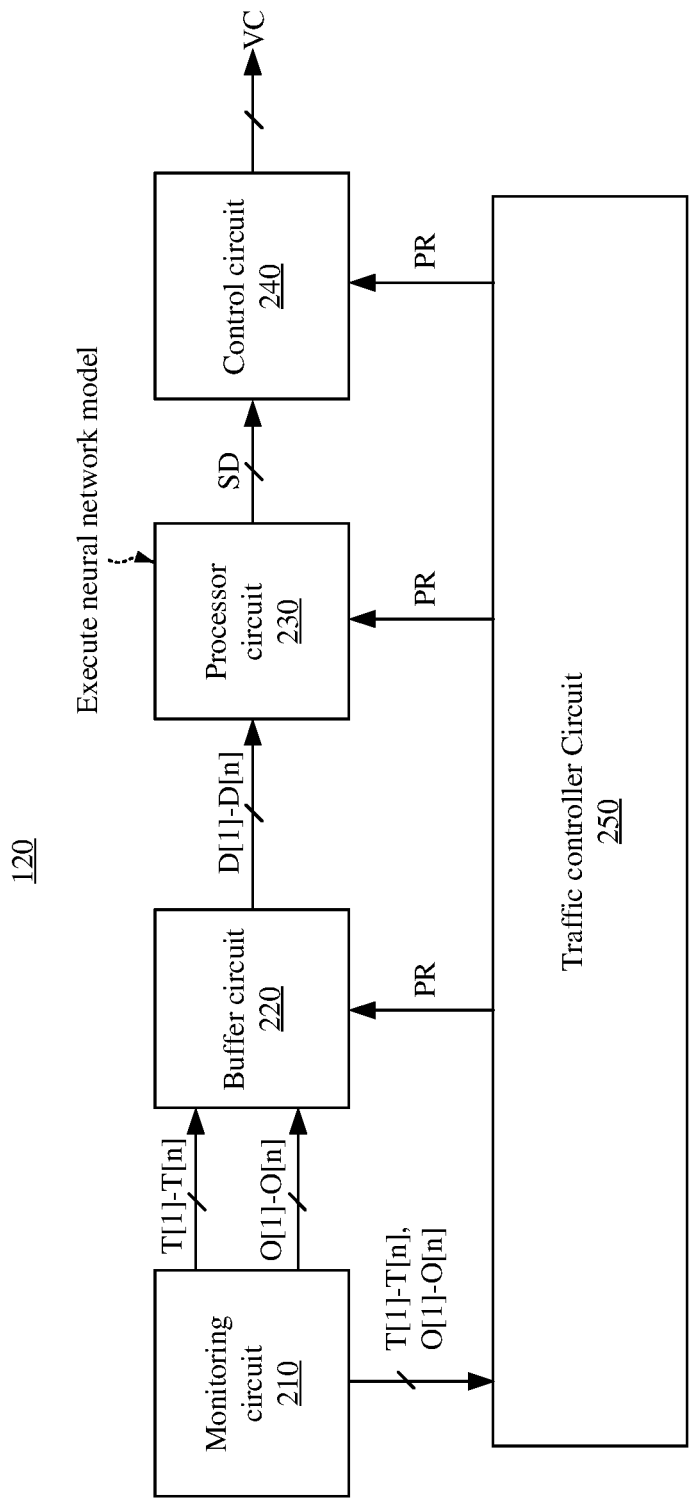
FIG. 2 illustrates a schematic diagram of the traffic scheduling circuitry in FIG. 1 according to some embodiments of the present disclosure.

FIG. 2 illustrates a schematic diagram of the traffic scheduling circuitry 120 in FIG. 1 according to some embodiments of the present disclosure. In some embodiments, the traffic scheduling circuitry 120 includes a monitoring circuit 210, a buffer circuit 220, a processor circuit 230, a control circuit 240, and a traffic controller circuit 250. In some embodiments, the above circuits may be implemented with digital circuit(s) that performs functions described below.

The monitoring circuit 210 may monitor the connection ports P[1]-P[n] (or S[1]-S[m]), to receive access requests issued from the devices 101[1]-101[n]. The monitoring circuit 210 is configured to monitor delay time (labeled as T[1]-T[n]) and the number of outstanding requests in the access requests (labeled as O[1]-O[n]) corresponding to each connection port P[1]-P[n] (or S[1]-S[m]). The descriptions about the delay time and the number of outstanding requests will be given with reference to FIG. 4.

The buffer circuit 220 is coupled to the monitoring circuit 210, and receives information of the delay times T[1]-T[n] and the number of outstanding requests O[1]-O[n]. The buffer circuit 220 is configured to generate traffic data (labeled as D[1]-D[n]) according to the information of the delay times T[1]-T[n] and the number of the outstanding requests O[1]-O[n]. Related operations about the buffer circuit 220 will be given with reference to FIG. 5.

The processor circuit 230 is configured to execute instructions of a neural network model to generate the decision signals SD according to the traffic data D[1]-D[n] and a predetermined rule PR. In some embodiments, the neural network model may be, but not limited to, a fully connected neural network model. In some embodiments, with the neural network model, the processor circuit 230 may perform a feature extraction according to the traffic data D[1]-D[n] to identify the current performance requirement of each connection port P[1]-P[n] (or S[1]-S[m]), and perform the decision according to the extracted features to generate the decision signals SD. Examples of the neural network model will be provided with reference to FIG. 6.

The control circuit 240 generates the control signals VC according to the decision signals SD and the predetermined rule PR. The traffic controller circuit 250 is configured to store information about the predetermined rule PR, and provide information about the predetermined rule PR to the processor circuit 230 and the control circuit 240, in order to cooperate with the processor circuit 230 and the control circuit 240 according to the predetermined rule PR. In some embodiments, the traffic controller circuit 250 further receives information about the delay times T[1]-T[n] and the number of outstanding requests O[1]-O[n], and receives system information and operational information of the back-end circuitry 130 (not shown), in order to assist the adjustment of access schedule.

Figure 3A:
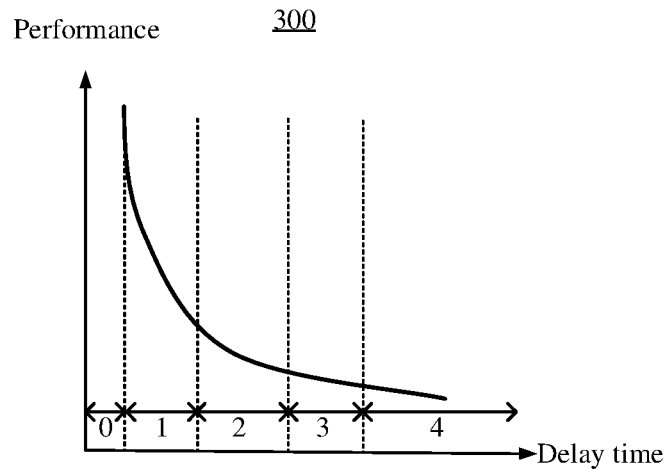
FIG. 3A illustrates a schematic diagram of a performance-delay model data according to some embodiments of the present disclosure.
Figure 3B:
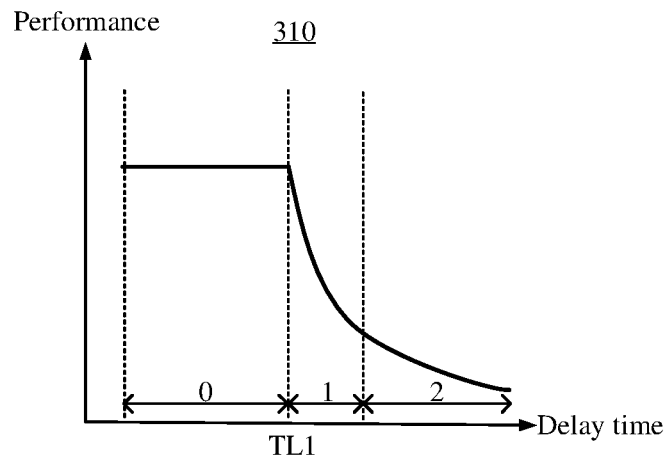
FIG. 3B illustrates a schematic diagram of a performance-delay model data according to some embodiments of the present disclosure.
Figure 3C:
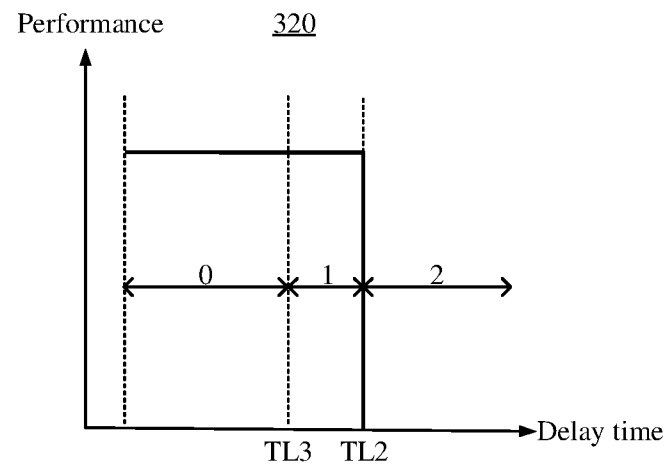
FIG. 3C illustrates a schematic diagram of a performance-delay model data according to some embodiments of the present disclosure.

In some embodiments, the predetermined rule PR includes performance-delay model data of each connection port P[1]-P[n] (or S[1]-S[m]). In some embodiments, the performance-delay model data indicate a sensitivity of a performance of a corresponding one of the connection ports P[1]-P[n] (or S[1]-S[m]) to the access delay time of the memory 150. In some embodiments, the performance-delay model data may further include information about QoS levels and upper limits of the number of outstanding requests of the connection ports P[1]-P[n] (or S[1]-S[m]), which may be utilized to set the predetermined rule PR and/or set a predetermined range during the progress of training the neural network model. If the QoS level is higher, the corresponding connection port will have a higher access priority after the initial arbitration. The upper limit of the number of outstanding requests indicates a maximum number of access requests able to be issued from the corresponding connection port during a certain period. If the analyzation is performed according to information including average access delay time, access data amount, and so on, it is able to derive the upper limit bandwidth to be used by the corresponding connection port. The performance-delay model data will be described with reference to FIG. 3A to FIG. 3C. For ease of understanding, examples in FIG. 3A to FIG. 3C are sequentially described with the connection ports P[1]-P[3] and the corresponding devices 101[1]-101[3], but the present disclosure is not limited thereto. The other connection ports P[4]-P[n] and the corresponding devices 101[4]-101[n] may be classified according to models shown in FIG. 3A to FIG. 3C.

FIG. 3A illustrates a schematic diagram of performance-delay model data 300 according to some embodiments of the present disclosure. Based on prior measurements and/or simulations and predetermined delay requirements and tolerance requirements, the performance-delay model data 300 corresponding to the connection port P[1] (or S[1]) can be obtained, in which the front-end circuitry 110 may be connected to the device 101[1] via the connection port P[1] and the connection port S[1]. In this example, the device 101[1] that utilizes the connection port S[1] for memory transmission is belong to a device that is sensitive to the access delay time of the memory 150 (e.g., a central processing unit). As shown in FIG. 3A, if the delay time is longer, the performance of the connection port P[1] or S[1] (and the device 101[1]) is significantly lower. In other words, in this example, performance-delay model data 300 may indicate that the connection port P[1] (or the connection port S[1]) has a higher QoS level and higher upper limit of the number of outstanding requests, in order to maintain the performance of the connection port P[1] (or [1]) and the device 101[1].

FIG. 3B illustrates a schematic diagram of performance-delay model data 310 according to some embodiments of the present disclosure. Similarly, based on prior measurements and/or simulations and predetermined delay requirements and tolerance requirements, it is able to obtain the performance-delay model data 310 corresponding to the connection port P[2] or S[2], in which the front-end circuitry 110 may be connected to the device 101[2] via the connection port P[2] and the connection port S[2]. In this example, the device 101[2] that utilizes the connection port S[2] for memory transmission is belong to a device that is less sensitive to the access delay time of the memory 150 (which may be, but not limited to, an image processing unit). As shown in FIG. 3B, if the lowest bandwidth requirements of the connection port P[2] or S[2] can be met, the performance of the device 101[2] is relatively insensitive to the delay time. However, if the delay time exceeds a threshold value TL1, the performance of the connection port P[2] (or S[2]) and that of the device 101[2] will be decreased. Thus, when the delay time does not exceed the threshold value TL1, the performance-delay model data 310 may indicate that the connection port P[2] or S[2] may have a lower QoS level. Alternatively, when the delay time exceeds the threshold value TL1, the performance-delay model data 310 may indicate that the connection port P[2] or S[2] may have a higher QoS level, or that the connection port P[2] or S[2] may the lower QoS level but have a higher upper limit of the number of outstanding requests.

FIG. 3C illustrates a schematic diagram of a performance-delay model data 320 according to some embodiments of the present disclosure. Similarly, based on prior measurements and/or simulations and predetermined delay requirements and tolerance requirements, it is able to obtain the performance-delay model data 320 corresponding to the connection port P[3] or S[3], in which the front-end circuitry 110 may be connected to the device 101[3] via the connection port P[3] and the connection port S[3]. In this example, the device 101[3] that utilizes the connection port S[3] for memory transmission is belong to a device that has a real-time requirement on the access delay time of the memory 150 (which may be, as an example but not limited to, a monitor, an image display controller, and so on). As shown in FIG. 3C, under a certain delay time, the performance of the connection port P[3] or S[3] (and/or the device 101[3]) may be kept as a normal value. However, once the delay time of the connection port P[3] exceeds a threshold value TL2, the operation of the device 101[3] will fail directly (for example, graphic glitches may be occurred on a display), which results in a direct degradation to the performance. Accordingly, when the delay time of the connection port P[3] exceeds the threshold value TL2, the performance-delay model data 320 may indicate that the connection port P[3] or S[3] is required to keep the upper limit of the number of outstanding requests being at a proper value and to have a highest QoS level, in order to avoid operation failures. When the delay time of the connection port P[3] does not exceed the threshold value TL2, the performance-delay model data 320 may indicate that the connection port P[3] or S[3] is kept having a relatively high QoS level.

Accordingly, it is understood that, the traffic controller circuit 250 may cooperate with the processor circuit 230 and the control circuit 240 according to information including the performance-delay model data 300, 310, and 320 in the predetermined rule PR to adjust the schedule of the corresponding the connections port P[1]-P[3] (or S[1]-S[3]) to access the memory 150, in order to dynamically maintain the performance of the corresponding devices 101[1], 101[2], and 101[3]. For example, when the delay time of the connection port P[3] (or S[1]) is going to exceed a threshold value TL3 in FIG. 3C (which is set to be less than the threshold value TL2), the traffic controller circuit 250 may cooperate with the control circuit 240 based on the predetermined rule PR to adjust the control signals VC, in order to make the connection port P[3] have a higher priority to access the memory 150. Furthermore, with the traffic controller circuit 250, it may assure that the decision made by the neural network model will not exceed limitations of each connection port P[1]-P[n] (or S[1]-S[m]). For example, it is able to prevent the decisions of the neural network model from causing the number of outstanding requests for a connection port being too small, or to prevent the decisions of the neural network model from causing the QoS level of a connection port being too low to affect its performance.

Figure 4:
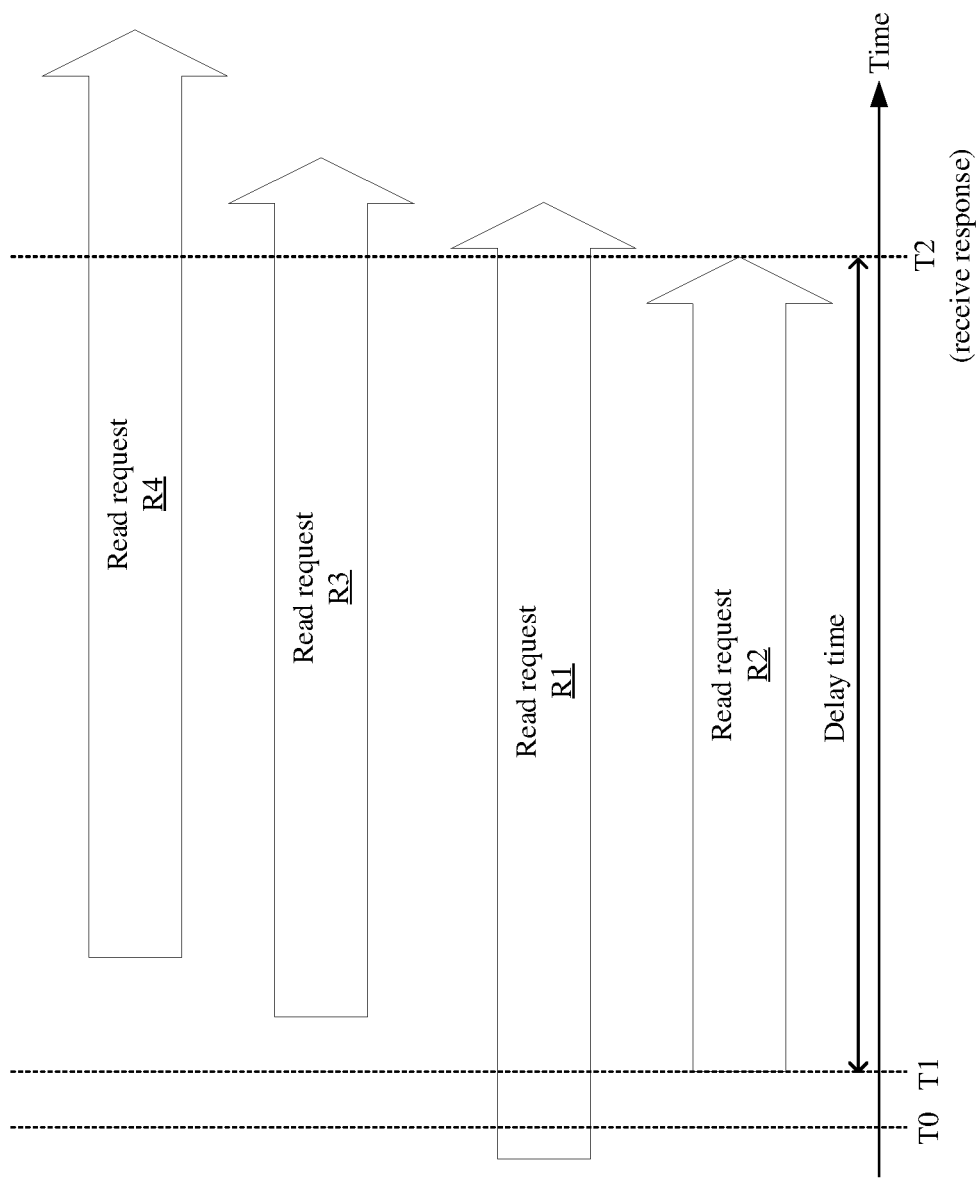
FIG. 4 illustrates a schematic diagram of operations of the monitoring circuit in FIG. 2 according to some embodiments of the present disclosure.

FIG. 4 illustrates a schematic diagram of operations of the monitoring circuit 210 in FIG. 2 according to some embodiments of the present disclosure. For ease of understanding, FIG. 4 only shows operations of monitoring a delay time and a number of outstanding requests of one connection port (which may be, for example, the connection port P[1]). As shown in FIG. 4, the monitoring circuit 210 may periodically monitor the access requests (FIG. 4 illustrates read request(s) as an example) on the connection port P[1].

In examples of FIG. 4, the connection port P[1] receives four read requests R1-R4 issued from the device 101[1]. In time T0, a previous monitoring (or sample) period just ends. In time T1, the monitoring circuit 210 detects that the read request issued after time T0 is the read request R2. In time T2, the monitoring circuit 210 detects that the device 101[1] receives a response to a corresponding one of the read requests R1-R4 (i.e., the earliest read request R2 received after the end of the previous monitoring period) via the connection port P[1], and thus stores the delay time of the read request R2 and the number of outstanding requests in the read requests R1-R4 to be information of the delay time T[1] and the number of outstanding request O[1] corresponding to the connection port P[1].

In this example, the delay time of the read request R2 is equal to a difference between time T1 and time T2. In some embodiments, the monitoring circuit 210 may determine that the device 101[1] receives the response to the read request R2 after the device 101[1] receives first data to be read by the read request R2 via the connection port P[1]. Under this condition, the number of outstanding requests (which includes the read request R2) in the read requests R1-R4 in time T2 is four. Alternatively, in some other embodiments, the monitoring circuit 210 may determine that the device 101[1] receives the response to the read request R2 after the device 101[1] receives all data to be read by the read request R2 via the connection port P[1]. Under this condition, the number of outstanding requests (only include the read requests R1, R3, and R4) in the read requests R1-R4 in time T2 is three.

With the above arrangements, the monitoring circuit 210 may only store a delay time of one access request during one monitoring period, instead of storing the delay time of all access requests. As a result, the cost and complexity of monitoring can be reduced. In some embodiments, the stored delay time may be considered as an average delay time of all access requests in the monitoring period. In some embodiments, by obtaining the average delay time and the number of outstanding requests, the data access rate of the corresponding connection port can be predicted. It is understood that examples of processing read requests shown in FIG. 4 are given for illustrative purposes, but the present disclosure is not limited thereto. In various embodiments, the access requests may be read request(s) and/or write request(s).

Figure 5:
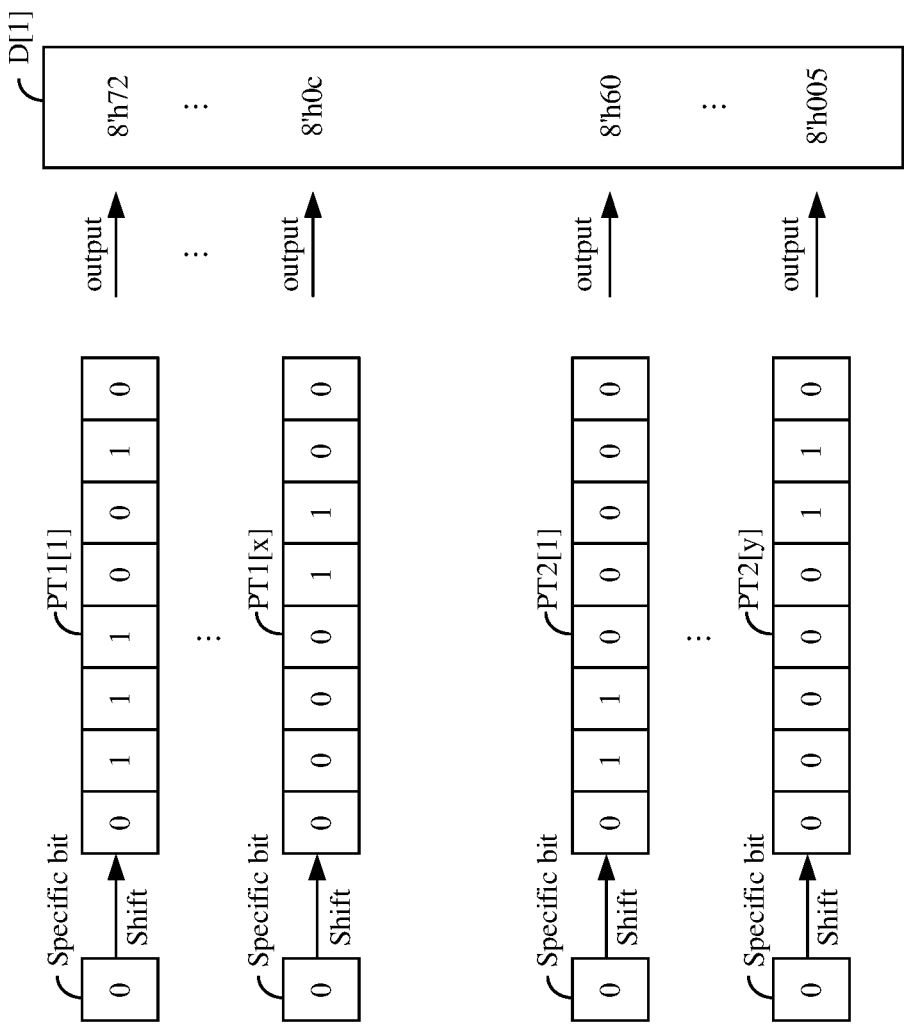
FIG. 5 illustrates a schematic diagram of operations of the buffer circuit in FIG. 2 according to some embodiments of the present disclosure.

FIG. 5 illustrates a schematic diagram of operations of the buffer circuit 220 in FIG. 2 according to some embodiments of the present disclosure. For ease of understanding and illustrative purposes, FIG. 5 is described with examples where the traffic data D[1] corresponding to the connection port P[1] is generated.

In some embodiments, each of the traffic data D[1]-D[n] includes first signal pattern s and second signal patterns, in which the first signal patterns respectively correspond to different time lengths, and the second signal pattern respectively correspond to different values. For example, the traffic data D[1] includes signal patterns PT1[1]-PT1[x] (i.e., the aforementioned first signal patterns) and signal patterns PT2[1]-PT2[y] (i.e., i.e., the aforementioned second signal patterns), in which x and y are positive integers greater than 1, respectively. In examples of FIG. 5, each of the signal patterns PT1[1]-PT1[x] and the signal patterns PT2[1]-PT2[y] includes multiple bits.

The buffer circuit 220 may periodically and selectively adjust a specific bit corresponding to one of the signal patterns PT1[1]-PT1[x] according to a time length of the delay time of the connection port P[1] stored by the monitoring circuit 210, and may periodically shift all bits of each signal pattern PT1[1]-PT1[x] based on the specific bit, to update the traffic data D[1]. For example, the aforementioned specific bit may be utilized to update a most significant bit of a corresponding one of the signal patterns PT1[1]-PT1[x], and the specific bit has a predetermined logic value (e.g., a logic value of 0). The signal patterns PT1[1]-PT1[x] correspond to different time length, respectively. For example, the timing length corresponding to the signal pattern PT1[1] is less than 100 cycles, the timing length corresponding to the signal pattern PT1[2] is 100 to 199 cycles, and the timing length corresponding to the signal pattern PT1[3] is 200 to 299 cycles. With this analogy, it is able to understand that the corresponding relation between the timing lengths and the signal patterns PT1[1]-PT1[x].

Under the above conditions, if the time length of the delay time of the connection port P[1] stored by the monitoring circuit 210 is less than 100 cycles, the buffer circuit 220 may update the specific bit corresponding to the signal pattern PT1[1] to be a logic value of 1, and update specific bits corresponding to the remaining signal patterns PT1[2]-PT1[x] to be logic values of 0. Afterwards, the buffer circuit 220 may shift all bits in the signal patterns PT1[1]-PT1[x] to the right, in which the specific bit is shifted to the most significant bit. As a result, the most significant bit in the signal pattern PT1[1] will be updated to be the logic value of 1, and the most significant bit of each remaining signal pattern PT1[2]-PT1[x] is kept being the logic value of 0. With the above arrangements, the signal patterns PT1[1]-PT1[x] in the traffic data D[1] can be periodically updated.

Similarly, the buffer circuit 220 may periodically and selectively update the specific bit corresponding one of the signal patterns PT2[1]-PT2[y] according to the number of outstanding requests corresponding to the connection port P[1] stored by the monitoring circuit 210, and periodically shift all bits of each signal pattern PT2[1]-PT2[y] based on the specific bits, in order to update the traffic data D[1]. For example, the specific bit may be utilized to update a most significant bit of each signal pattern PT2[1]-PT2[y], and the specific bit has a predetermined logic value (e.g., a logic value of 0). The signal patterns PT2[1]-PT2[y] respectively correspond to different numerical ranges, and the numerical ranges correspond to different numbers of outstanding requests. For example, the numerical range corresponding to the signal pattern PT2[1] is less than 4, the numerical range corresponding to the signal pattern PT2[2] is 4-8, and the numerical range corresponding to the signal pattern PT2[3] is 9-13. With this analogy, it is able to understand the corresponding relation between the numerical ranges and the signal patterns PT2[1]-PT2[y].

Under the above conditions, if the number of outstanding requests corresponding to the connection port P[1] stored by the monitoring circuit 210 is less than 4, the buffer circuit 220 may update the specific bit corresponding to the signal pattern PT2[1] to be the logic value of 1, and keep the specific bits corresponding to each remaining signal pattern PT2[2]-PT2[y] being as logic values of 0. Afterwards, the buffer circuit 220 may shift all bits of the signal patterns PT2[1]-PT2[y] to the right, in which the specific bit is shifted to the most significant bit. As a result, the most significant bit of the signal pattern PT2[1] will be updated to be the logic value of 1, and the most significant bit of each remaining signal pattern PT2[2]-PT2[y] is kept being as the logic value of 0. With the above arrangements, the signal patterns PT2[1]-PT2[y] of the traffic data D[1] can be periodically updated.

In some embodiments, the buffer circuit 220 may include shift registers, in order to perform operations in FIG. 5. In some embodiments, the buffer circuit 220 may perform operations in FIG. 5 during a predetermined period, and the predetermined period may be set according to the update time of the memory 150 and a minimum delay time tolerated by the system.

Figure 6:
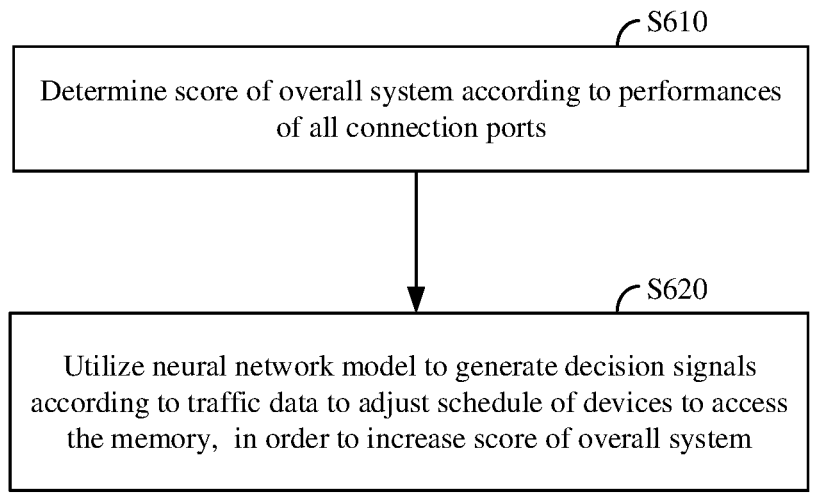
FIG. 6 illustrates a flow chart of operations of a neural network model according to some embodiments of the present disclosure.

FIG. 6 illustrates a flow chart of operations of the neural network model according to some embodiments of the present disclosure. In some embodiments, decisions made by the neural network model can be verified by scoring method. For example, as shown in FIG. 3A, according to different delay times, performance-delay model data 300 be separated into reward ranges 0-4. As shown in FIG. 3B, according to different delay times, the performance-delay model data 310 may be separated into three reward ranges 0-2. As shown in FIG. 3C, according to different delay times, the performance-delay model data 320 may be separated into three reward ranges 0-2 separated into three reward ranges 0-2. According to different performances, the scores corresponding to those reward ranges can be set as shown in the following table:

|  | connection port P[1] | connection port P[2] | connection port P[3] |
|---|---|---|---|
| reward range 0 | 5 | 3 | 1 |
| reward range 1 | 4 | 1 | −5 |
| reward range 2 | 3 | 0 | −100 |
| reward range 3 | 2 | — | — |
| reward range 4 | 1 | — | — |

When the processor circuit 230 executes instructions of the neural network model to generate the corresponding decisions (i.e., the decision signals SD) according to the traffic data D[1]-D[n], the processor circuit 230 may utilize the above table to determine the score of overall system. If the score is higher, it indicates that the performance of the overall system is getting better with decisions made by neural network model. As a result, it is able to verify that the decisions made by neural network model are correct. For example, the processor circuit 230 may utilize the following equation to determine the score of overall system:

$$\text{Total score} = \sum_{p[1] \sim P[n]} \sum_{i=1}^{m} (\text{Score}(i))$$

in which, Total score indicates the score of the overall system, m is the number of the reward ranges, and Score(i) indicates the score corresponding to the reward range. For example, with reference to the above table, in view of the connection port P[1], if the delay time correspond to the reward range 0, the corresponding score is 5. The above equation for determining the score is given for illustrative purposes, and the present disclosure is not limited thereto. For example, in some embodiments, the above equation can be further normalized based on the number of the connection ports.

Reference is made to FIG. 6, in operation S610, a score of overall system is determined according to performances of all connection ports. In operation S620, a neural network model is utilized to generate decision signals according to traffic data to adjust a schedule of devices to access the memory, in order to increase the score of overall system. For example, after the previous adjustment, the processor circuit 230 utilizes the above equation to obtain the score of overall system, and the processor circuit 230 determines that the connection port P[1] has a lower performance while the connection port P[3] has a higher performance and a certain delay tolerance according to the traffic data D[1]-D[n]. Accordingly, the neural network model may determine to increase the QoS level of the connection port P[1], and decrease the QoS level and the upper limit of the number of outstanding requests of the connection port P[3], in order to further improve the score of overall system.

It is understood that the above operations can also be used to train the neural network model. For example, the first score of overall system can be determined before the neural network model generate decisions. After the neural network model generates the decisions, the second score of overall system can be determined, and whether the second score is higher than the first score is checked. If the second score is not higher than the first score, parameters in the neural network model and/or the method of capturing features (e.g., Score(i)) may be required to be modified.

Operations in FIG. 4 to FIG. 6 are given with examples where the connection ports P[1]-P[n] are monitored, but the present disclosure is not limited thereto. In some other embodiments, operations in FIG. 4 to FIG. 6 may be performed by monitoring the connection ports S[1]-S[m].

Figure 7:
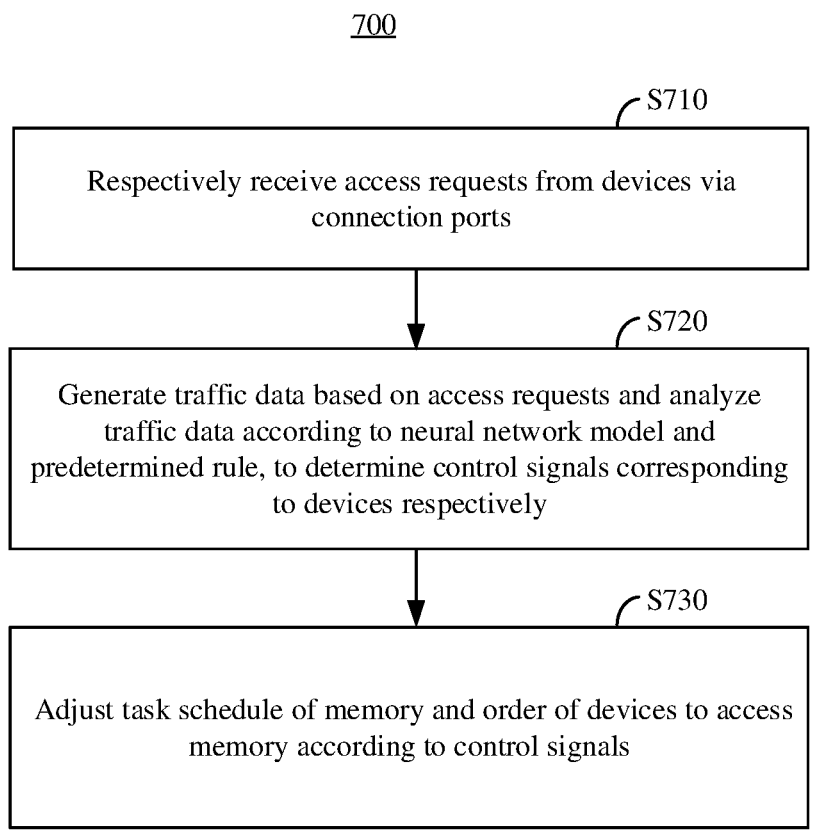
FIG. 7 illustrates a flow chart of a memory control method according to some embodiments of the present disclosure.

FIG. 7 illustrates a flow chart of a memory control method 700 according to some embodiments of the present disclosure. In operation S710, access requests from devices are respectively received via connection ports. In operation S720, traffic data are generated based on the access requests and are analyzed according to a neural network model and a predetermined rule, to determine control signals corresponding to the devices respectively. For example, the traffic scheduling circuitry 120 may perform operations in FIG. 2, FIG. 4, FIG. 5, and/or FIG. 6 to implement operation S720. In operation S730, a task schedule of a memory and an order of the devices to access the memory are adjusted according to the control signals.

The above operations of the memory control method 700 can be understood with reference to above embodiments, and thus the repetitious descriptions are not further given. The above description of the memory control method 700 includes exemplary operations, but the operations of the memory control method 700 are not necessarily performed in the order described above. Operations of the memory control method 700 may be added, replaced, changed order, and/or eliminated, or the operations of the memory control method 700 may be executed simultaneously or partially simultaneously as appropriate, in accordance with the spirit and scope of various embodiments of the present disclosure.

As mentioned above, the memory control system and the memory control method in some embodiments of the present disclosure may periodically monitor the delay time and the number of outstanding requests of the connection ports to generate traffic data, and analyze the traffic data with a neural network model to adjust the task schedule and the access order of the memory. As a result, the task schedule of the memory can be adjusted in real time according to system requirements, in order to maintain system performance more effectively.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A memory control system, comprising:
a front-end circuitry configured to receive a plurality of access requests from a plurality of devices, and adjust an order of the plurality of devices to access a memory according to a plurality of control signals;
a traffic scheduling circuitry configured to generate a plurality of traffic data based on the plurality of access requests and analyze the plurality of traffic data based on a neural network model and a predetermined rule, in order to determine the plurality of control signals; and
a back-end circuitry configured to adjust a task schedule of the memory according to the plurality of control signals,
wherein the front-end circuitry is coupled to a first device in the plurality of devices via a first connection port in a plurality of connection ports to receive a plurality of first access requests in the plurality of access requests, and the traffic scheduling circuitry is configured to:
store a delay time of a corresponding one of the plurality of first access requests and a number of outstanding requests in the plurality of first access requests when the first device receives a response to the corresponding one of the plurality of first access requests, and
generate first data in the plurality of traffic data that corresponds to the first connection port based on the delay time and the number of outstanding requests in the plurality of first access requests.

2. The memory control system of claim 1, wherein the first data comprises a plurality of first signal patterns and a plurality of second signal patterns, the traffic scheduling circuitry is configured to:
adjust the plurality of first signal patterns based on a time length of the delay time and adjust the plurality of second signal patterns based on a value of the number.

3. The memory control system of claim 2, wherein the plurality of first signal patterns respectively correspond to different time lengths, and the plurality of second signal patterns respectively correspond to different values.

4. The memory control system of claim 2, wherein the traffic scheduling circuitry is configured to:
periodically and selectively adjust a specific bit corresponding to one of the plurality of first signal patterns according to the time length of the delay time; and
periodically shift all bits of each of the plurality of first signal patterns based on the specific bit, in order to update the first data.

5. The memory control system of claim 4, wherein the specific bit is to update a most significant bit of the one of the plurality of first signal patterns.

6. The memory control system of claim 2, wherein the traffic scheduling circuitry is configured to:
periodically adjust a specific bit of one of the plurality of second signal patterns according to the value of the number; and
periodically shift all bits of each of the plurality of second signal patterns based on the specific bit, in order to update the first data.

7. The memory control system of claim 1, wherein the predetermined rule is configured to store performance-delay model data corresponding to each of the plurality of connection ports, and the performance-delay model data indicates a sensitivity of a performance of a corresponding one of the plurality of connection ports to an access delay time of the memory.

8. The memory control system of claim 7, wherein the performance-delay model data further indicates a quality of service (QOS) level and an upper limit of a number of outstanding requests of the corresponding one the plurality of connection ports.

9. A memory control method, comprising:
receiving a plurality of access requests from a plurality of devices via a plurality of connection ports, respectively;
generating a plurality of traffic data based on the plurality of access requests, and analyzing the plurality of traffic data based on a neural network model and a predetermined rule, in order to determine a plurality of control signals corresponding to the plurality of devices, respectively; and
adjusting a task schedule of a memory and an order of the plurality of devices to access the memory according to the plurality of control signals,
wherein generating the plurality of traffic data based on the plurality of access requests, and analyzing the plurality of traffic data based on the neural network model and the predetermined rule, in order to determine the plurality of control signals corresponding to the plurality of devices, respectively comprises:
storing a delay time of a corresponding one of a plurality of first access requests in the plurality of access requests and a number of outstanding requests in the plurality of first access requests when a first device of the plurality of devices receives a response to the corresponding one of the plurality of first access requests; and
generating first data in the plurality of traffic data based on the delay time and the number of outstanding requests in the plurality of first access requests, wherein the first data corresponds to one of the plurality of connection ports that is connected to the first device.

10. The memory control method of claim 9, wherein the first data comprises a plurality of first signal patterns and a plurality of second signal patterns, and generating the first data based on the delay time and the number of outstanding requests in the plurality of first access requests comprises:
adjusting the plurality of first signal patterns based on a time length of the delay time; and
adjusting the plurality of second signal patterns based on a value of the number of outstanding requests.

11. The memory control method of claim 10, wherein the plurality of first signal patterns respectively correspond to different time lengths, and the plurality of second signal patterns respectively correspond to different values.

12. The memory control method of claim 10, wherein adjusting the plurality of first signal patterns based on the time length of the delay time comprise:
periodically and selectively adjusting a specific bit corresponding to one of the plurality of first signal patterns according to the time length of the delay time; and
periodically shifting all bits of each of the plurality of first signal patterns based on the specific bit, in order to update the first data.

13. The memory control method of claim 12, wherein the specific bit is to update a most significant bit of the one of the plurality of first signal patterns.

14. The memory control method of claim 10, wherein adjusting the plurality of second signal patterns based on the value of the number of outstanding requests comprises:
periodically adjusting a specific bit of one of the plurality of second signal patterns according to the value of the number of outstanding requests; and
periodically shifting all bits of each of the plurality of second signal patterns based on the specific bit, in order to update the first data.

15. The memory control method of claim 9, wherein generating the plurality of traffic data based on the plurality of access requests, and analyzing the plurality of traffic data based on the neural network model and the predetermined rule, in order to determine the plurality of control signals corresponding to the plurality of devices, respectively comprises:
monitoring a delay time and a number of outstanding requests in the plurality of access requests corresponding to each of the plurality of connection ports according to the plurality of access requests;
generating the plurality of traffic data according to the delay time and the number of outstanding requests in the plurality of access requests corresponding to each of the plurality of connection ports;
executing the neural network model to generate a plurality of decision signals according to the plurality of traffic data and the predetermined rule; and
generating the plurality of control signals according to the plurality of decision signals and the predetermined rule.

16. The memory control method of claim 9, wherein the predetermined rule is configured to store performance-delay model data corresponding to each of the plurality of connection ports, and the performance-delay model data indicates a sensitivity of a performance of a corresponding one of the plurality of connection ports to an access delay time of the memory.

17. The memory control method of claim 16, wherein the performance-delay model data further indicates a quality of service (QOS) level and an upper limit of a number of outstanding requests of the corresponding one the plurality of connection ports.

18. A memory control system, comprising:
a front-end circuitry configured to receive a plurality of access requests from a plurality of devices, and adjust an order of the plurality of devices to access a memory according to a plurality of control signals;
a traffic scheduling circuitry configured to generate a plurality of traffic data based on the plurality of access requests and analyze the plurality of traffic data based on a neural network model and a predetermined rule, in order to determine the plurality of control signals; and
a back-end circuitry configured to adjust a task schedule of the memory according to the plurality of control signals,
wherein the front-end circuitry is coupled to the plurality of devices respectively via a plurality of connection ports to receive the plurality of access requests, and the traffic scheduling circuitry comprises:
a monitoring circuit configured to monitor a delay time and a number of outstanding requests in the plurality of access requests corresponding to each of the plurality of connection ports according to the plurality of access requests;
a buffer circuit configured to generate the plurality of traffic data according to the delay time and the number of outstanding requests in the plurality of access requests corresponding to each of the plurality of connection ports;
a processor circuit configured to execute instructions of the neural network model to generate a plurality of decision signals according to the plurality of traffic data and the predetermined rule;
a control circuit configured to generate the plurality of control signals according to the plurality of decision signals and the predetermined rule; and a traffic control circuit configured to store the predetermined rule and cooperate with the processor circuit and the control circuit according to the predetermined rule.

\* \* \* \* \*